F. B. CONVERSE.
MACHINE AND METHOD FOR APPLYING RUBBER TREADS TO PNEUMATIC TIRES.
APPLICATION FILED MAR. 10, 1916.

1,270,380.

Patented June 25, 1918.
6 SHEETS—SHEET 1.

INVENTOR.
F. B. Converse
BY Robert M. Pierson
ATTORNEYS.

F. B. CONVERSE.
MACHINE AND METHOD FOR APPLYING RUBBER TREADS TO PNEUMATIC TIRES.
APPLICATION FILED MAR. 10, 1916.

1,270,380.

Patented June 25, 1918.
6 SHEETS—SHEET 4.

INVENTOR.
F. B. Converse
BY Robert M Pierson
ATTORNEY

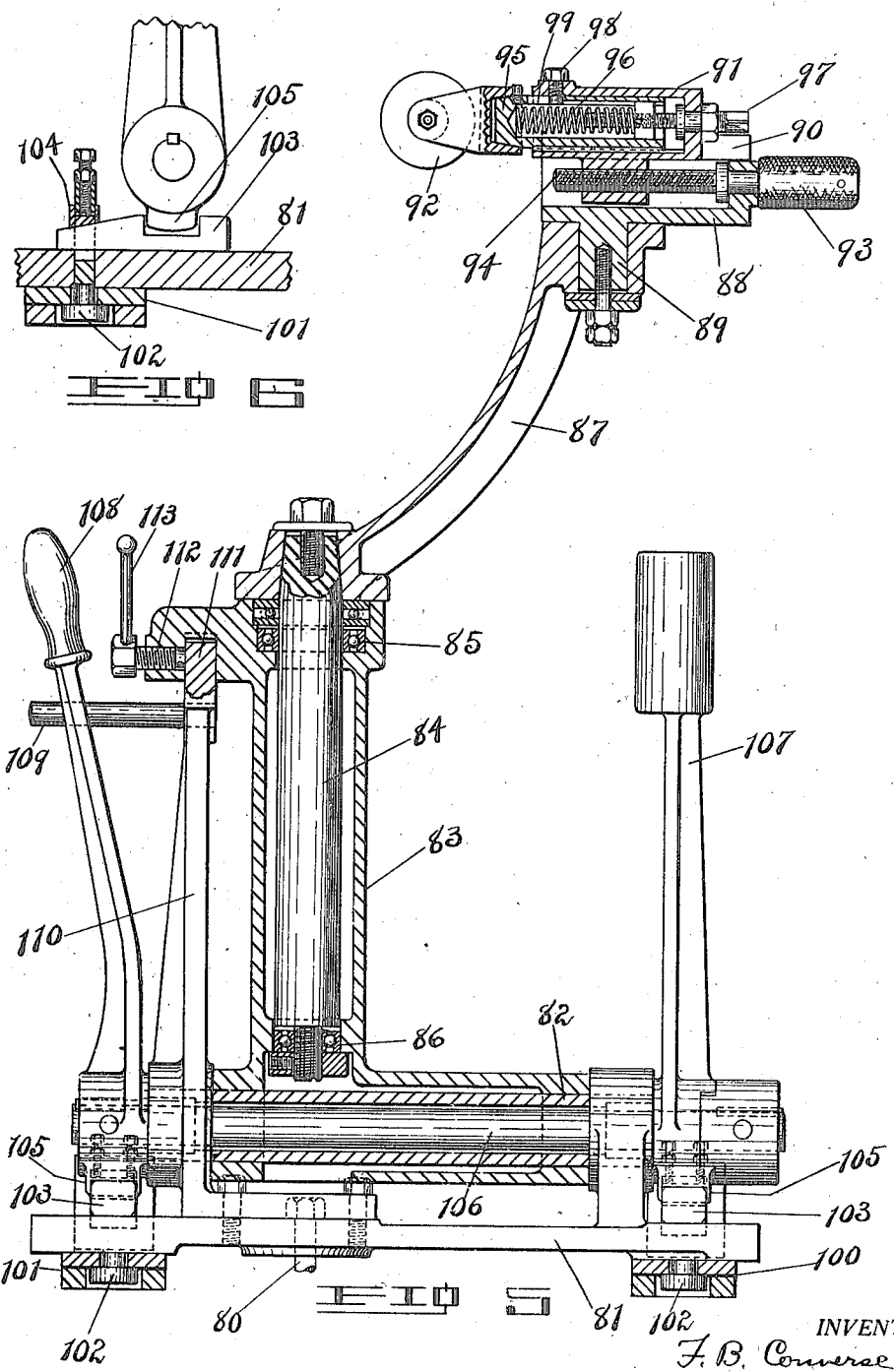

F. B. CONVERSE.
MACHINE AND METHOD FOR APPLYING RUBBER TREADS TO PNEUMATIC TIRES.
APPLICATION FILED MAR. 10, 1916.
1,270,380.
Patented June 25, 1918.
6 SHEETS—SHEET 6.
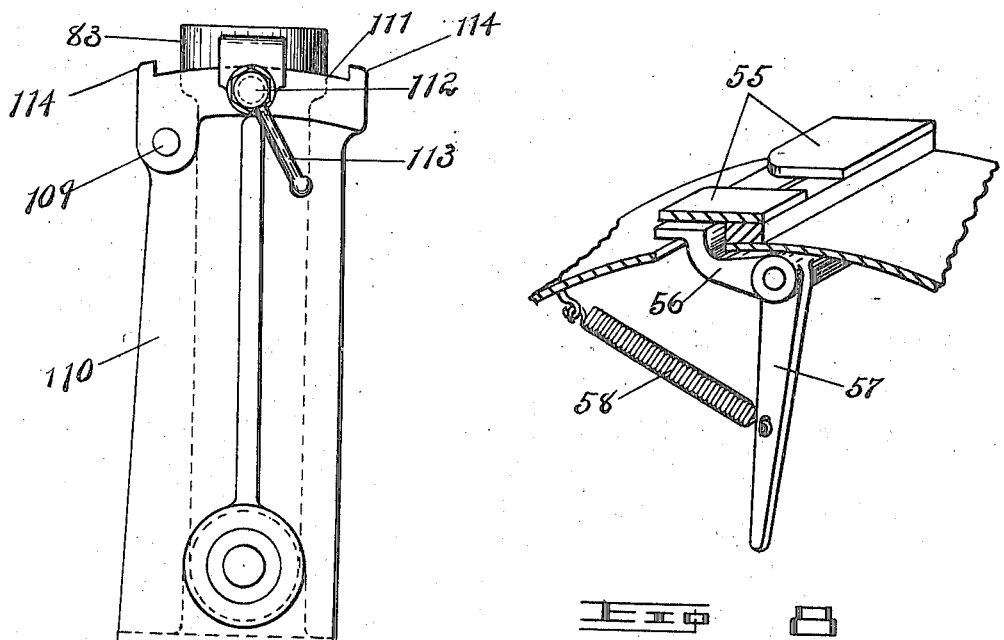
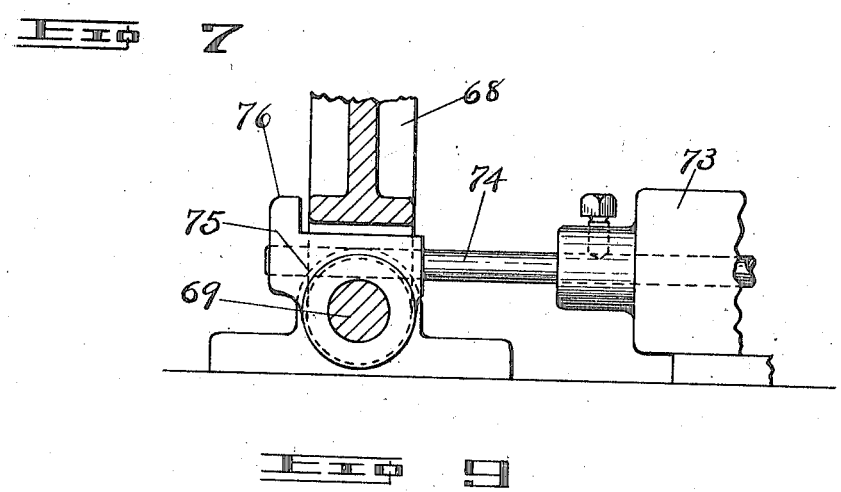
INVENTOR.
F. B. Converse
BY Robert M. Pierson
ATTORNEY.

UNITED STATES PATENT OFFICE.

FRANCIS B. CONVERSE, OF AKRON, OHIO, ASSIGNOR TO THE B. F. GOODRICH COMPANY, OF NEW YORK, N. Y., A CORPORATION OF NEW YORK.

MACHINE AND METHOD FOR APPLYING RUBBER TREADS TO PNEUMATIC TIRES.

1,270,380.

Specification of Letters Patent.

Patented June 25, 1918.

Application filed March 10, 1916. Serial No. 83,402.

*To all whom it may concern:*

Be it known that I, FRANCIS B. CONVERSE, a citizen of the United States, residing at Akron, in the county of Summit and State of Ohio, have invented certain new and useful Improvements in Machines and Methods for Applying Rubber Treads to Pneumatic Tires, of which the following is a specification.

This invention relates to a method and apparatus for applying a rubber tread-strip to the carcass of a pneumatic tire, an operation which, prior to my invention, has commonly been done by hand.

Of the accompanying drawings, showing a preferred embodiment,

Fig. 5 represents a vertical section of the stitcher and its standard, with the stitcher swung around to one side.

Fig. 6 is a detail sectional view showing one of the wedge clamps for locking the stitcher standard on its tracks.

Fig. 7 represents a detail side elevation of the means for locking the stitcher standard in a radial direction relative to the tire core.

Fig. 8 represents a detail sectional perspective view of the clamp for the leading end of the tread strip.

Fig. 9 represents a detail section of the means for picking up and releasing a counter-weight as the standard for the tread-applying wheel is swung in and out with reference to the tire core.

Figure 1:
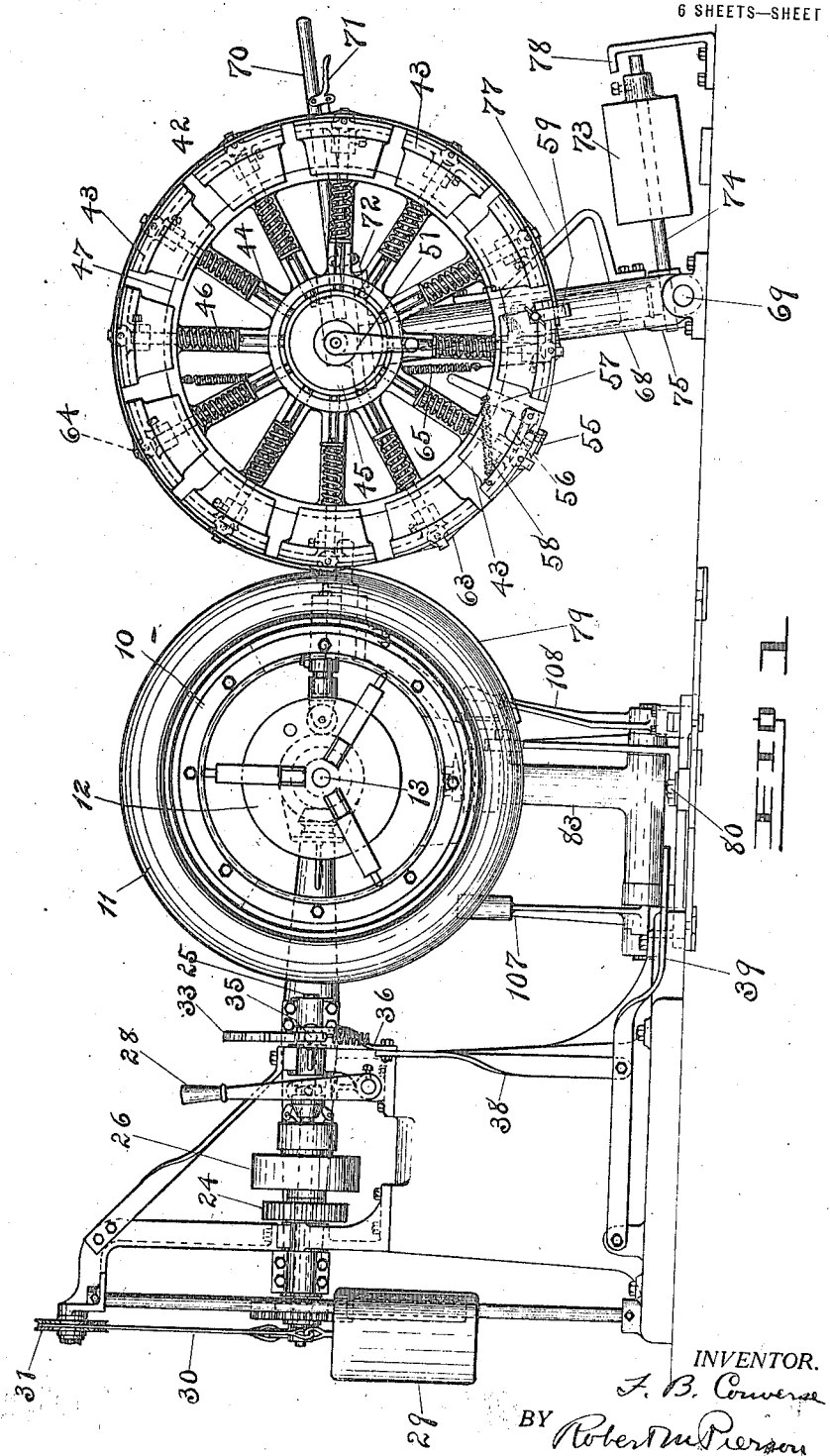
Figure 1 represents a side elevation of my apparatus as used in applying the tread strip to a tire carcass.

10 is the annular core or mandrel which may be brought to the machine with the tire carcass 11, composed of layers of woven fabric or cord and beads already applied to said core, and then mounted on the arms of an adjustable chuck 12 carried by a shaft 13. Or the chuck 12 may be that of a tire-making machine of any suitable type, having means for applying the carcass to the core. The chuck 12 is here shown as journaled in the arms of a bearing fork 14 and carries a bevel gear 15 meshing with a complemental gear 16 on the end of a longitudinal shaft 17 which is mounted in a swinging frame 18. Said frame has arms 19 adapted to turn on sleeve bosses about a shaft 20 which drives the shaft 17 through a pair of spur gears 21, 22 and is driven by a pair of spur gears 23, 24 from shaft 25. On the latter is a belt pulley 26, and a clutch 27 operated by a handle 28 for connecting said pulley with shaft 25 and disconnecting it therefrom. This construction enables the plane of the core to be swung around the axis of shaft 20 as a center to horizontal, vertical and various intermediate positions, and provides for positively driving the core in all of these positions. The mass of the frame 18 and other off-center parts on that side is counter-balanced by a weight 29 connected with a bracket on the frame by a cord 30 running over pulleys 31, 32. One of the arms 19 has a locking segment 33 formed with notches 34 in its periphery, adapted to be entered by a bolt 35 which is operated through the medium of a bell-crank lever 36 yieldingly drawn into locking position by a spring 37 and retracted by a link 38 and pedal 39, whereby the frame 18 may be located with the plane of the core at various angles through a range of about 180°, principally for the purpose of allowing the operator to apply the side strips and finish the tire by hand after the tread has been applied and rolled down by means of the stitcher.

Provision is also made for locking the chuck shaft 13 against rotation, by forming notches 40 on the back of gear 15 and providing a spring bolt 41 to interlock with said notches.

I provide a tread-applying device most conveniently made in the form of a wheel 42 whose rim comprising a series of radially-movable plates or sections 43 attached to the outer ends of spokes 44 whose inner ends abut against an adjusting cone 45, springs 46 being provided for pressing the spokes inwardly against said cone. The spokes are carried by a spider 47 loosely journaled on a fixed shaft 48 and adapted to be turned by hand, the spider having an outwardly-projecting hub or sleeve 49 on which the cone 45 is adjusted in and out by means of a screw 50 engaging a thread in the fixed shaft 48 and turned by a handle 51. Each rim segment 43 is provided on its middle lines with a circumferentially extending rib 52 to support the tread strip as nearly as possible in a circular shape, and a transverse rib 53, these ribs being of relatively small area so as to allow a nearly uniform stretching in all parts of the rubber, and the transverse ribs having suitable lateral-positioning marks 54, as seen in Fig. 2, for so locating the tread on the wheel 42 that it will be symmetrical with the tire core when rolled onto the latter.

There is further provided on one of the sections 43 a clamp for the leading end of the tread comprising a fixed jaw 55 and a movable jaw 56, the latter being an arm of a lever having a handle arm 57 yieldingly drawn into jaw-closing position by a spring 58. Another clamp 59 is provided for the following or rear end of the tread, this clamp being removable and shiftable to different circumferential positions to allow for treads of different lengths, being held in position by a set-screw 60, which causes a hook 61 on the clamp to engage a flange 62 with which the several rim sections 43 are provided. The operative diameter and circumference of the wheel 42 are at least as great as those of the cores and their carcasses of sizes within the range of the machine, so that no tread strip will be longer than the periphery of the wheel.

To measure the length of the tread strip, I provide a steel tape 63 suitably graduated in inches and fractions, or other linear units, and supported on loosely journaled grooved rollers 64 on the rim segments 43 so as to be opposite and substantially coincident with the edge of the tread strip. One end of this tape is anchored on the fixed jaw 55 of the leading-end clamp for the tread as seen in Fig. 2, and the opposite end portion, after passing around the pulley on the next-adjacent or last rim segment, turns inwardly and is attached to a spring 64 stretched across the wheel, said spring acting to keep the measuring tape taut as the rim of wheel 42 is expanded and contracted.

Figure 2:
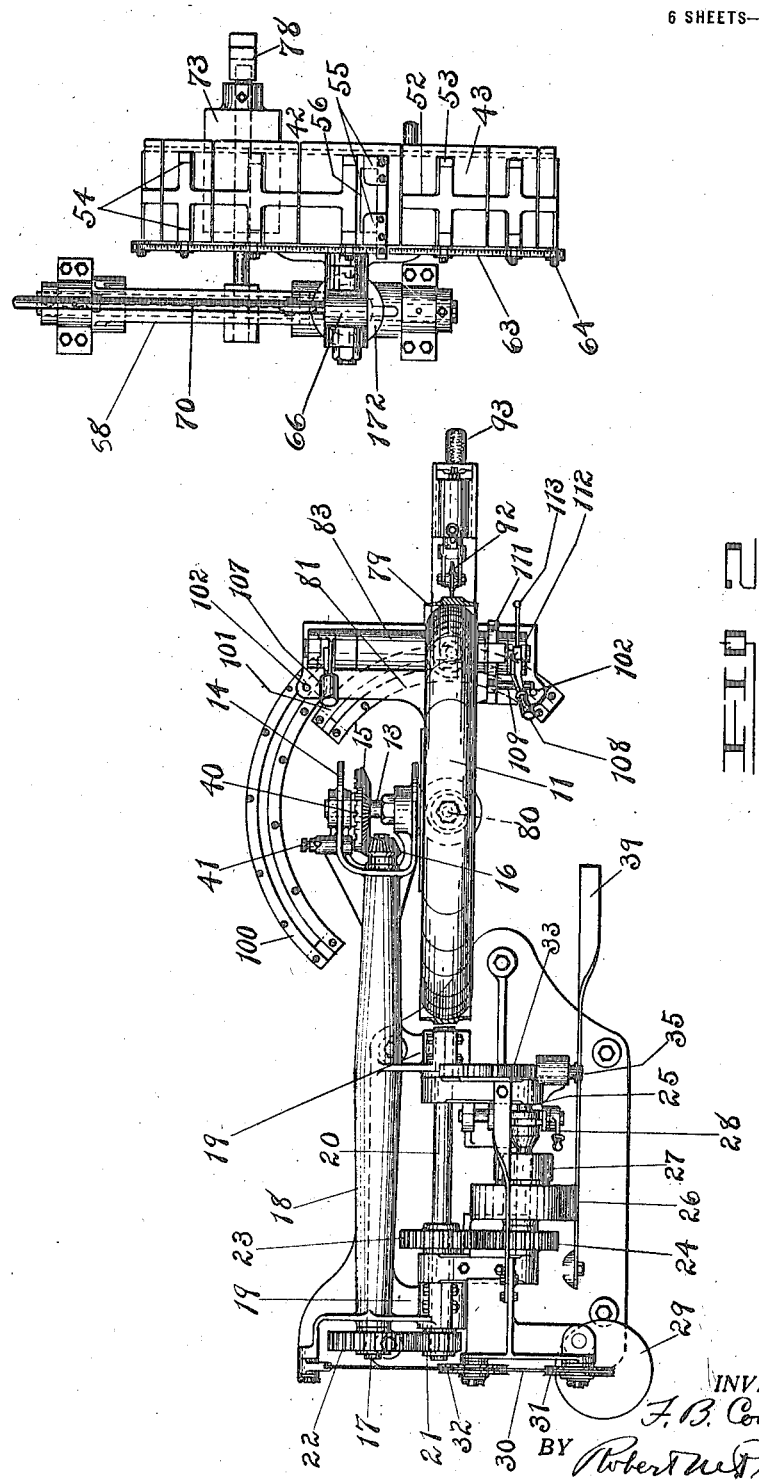
Fig. 2 represents a plan view showing the tread-applying wheel swung aside and a stitcher moved into place to roll down the tread.
Figure 3:
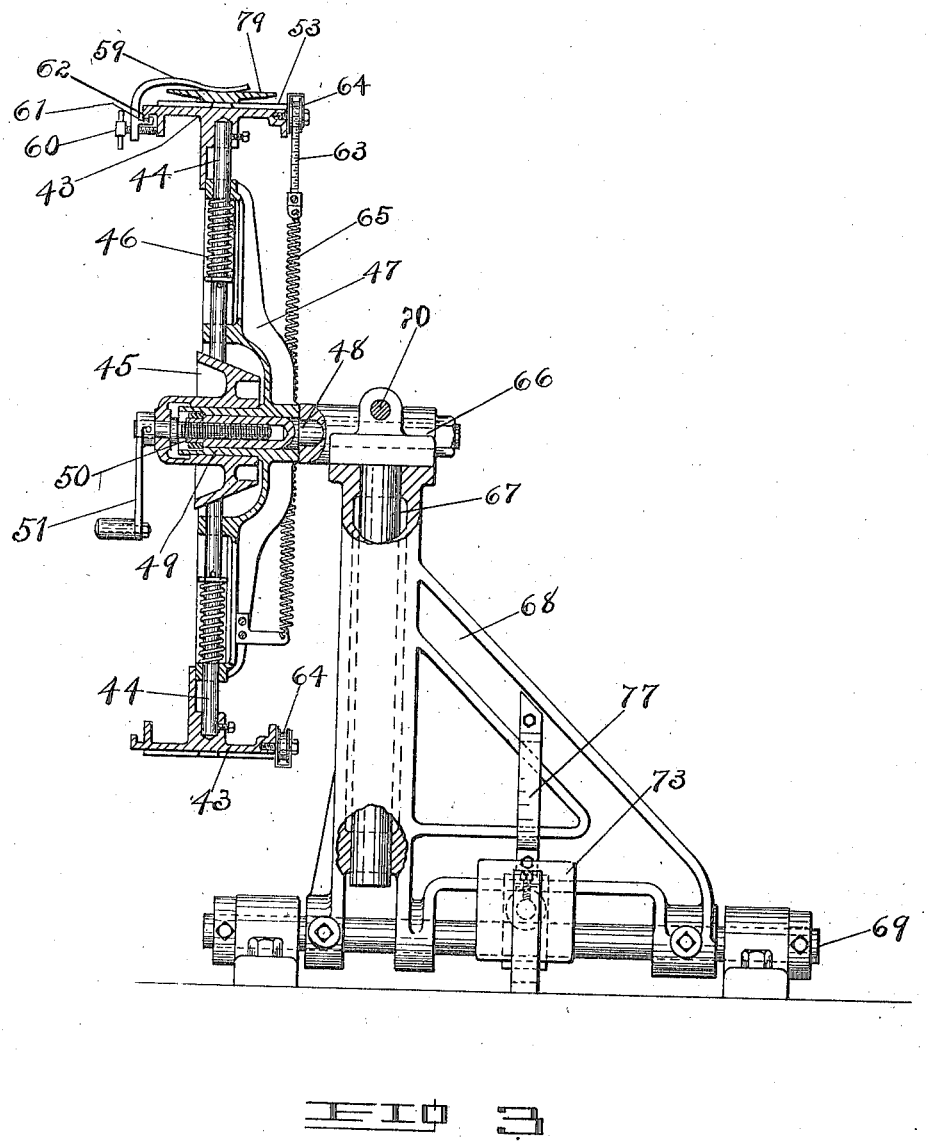
Fig. 3 represents a transverse vertical section of the tread-applying wheel and its standard.
Figure 4:
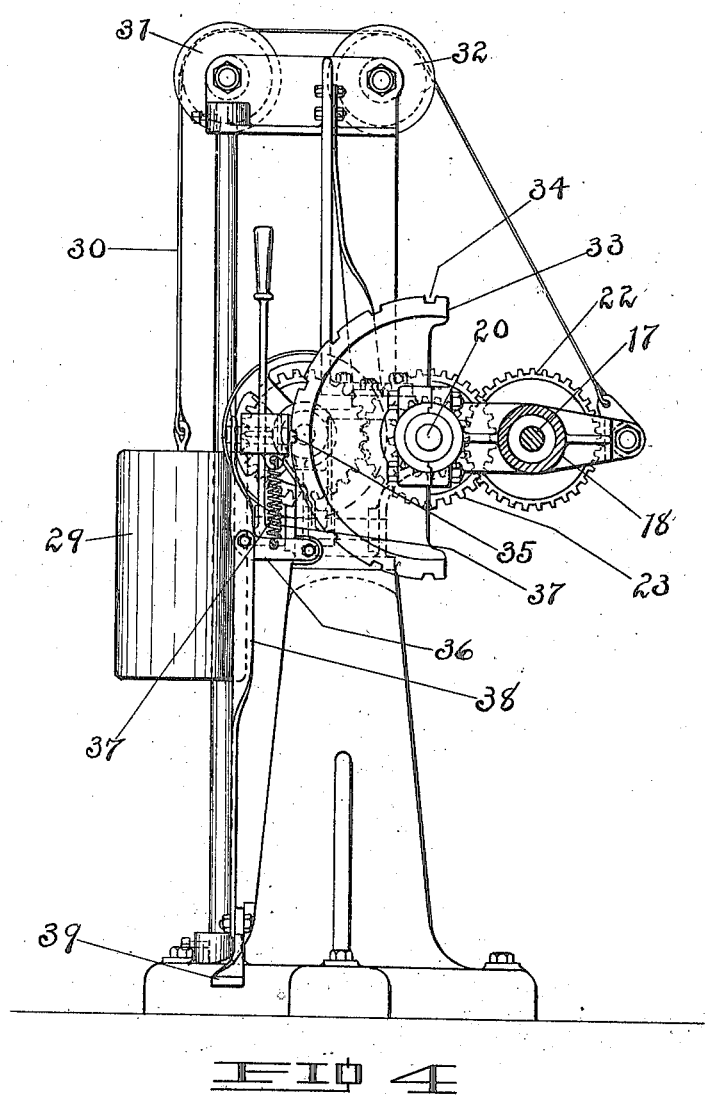
Fig. 4 represents a rear end view of the mechanism for supporting and rotating the tire core.

The fixed shaft 48, on which the tread-applying wheel is journaled, is mounted in a swiveling bracket 66 whose upright stem 67 turns in a standard 68 mounted on a horizontal rock-shaft 69, this standard being rocked and the wheel swiveled manually by a long handle 70 attached to bracket 66, said handle having a lever 71 for operating a locking pawl 72 (Fig. 1) which enters either of two notches 90° apart in a segment 172 (Fig. 2) at the summit of the standard 68, so as to lock the swiveling bracket 66 with the tread-applying wheel in either the operative position shown in Fig. 1 or the inoperative position shown in Fig. 2.

When wheel 42 is turned into the plane of the tire core, handle 70 may be used to swing the standard 68 and its rock-shaft 69 in the bearings of the latter toward and away from the core. A counter-weight 73 is provided on an arm 74 attached to a hub 75 loosely surrounding the rock-shaft and having a projection 76 adapted to engage the standard 68 with lost motion, the counter-weight being picked up on the inward swinging movement of the standard 68 when the latter has just passed its vertical position. In the retracted position of the wheel, weight 73 rests against the floor, and standard 68 rests against the weight by an elbow 77 on said standard. A stop 78 is mounted on the floor to engage the extremity of the counter-weight arm and prevent the structure from swinging too far inwardly in the direction of the core support. This lost-motion counter-weight connection enables the mass of the tread-applying wheel and standard to be nearly balanced by the weight when they lean toward the core, and prevents the mass of the counter-weight from being added to that of the wheel and standard when they lean outwardly.

In operating the apparatus as thus far described, a core 10 with a tire carcass 11 thereon is positioned on the chuck 12 with the latter turned into a vertical plane and the swinging frame 18 locked by means of bolt 35. The tread-applying wheel 42 being positioned in the same vertical plane but retracted or caused to lean outwardly from the position shown in Fig. 1, a rubber tread strip 79, with which may have been assembled the fabric breaker-strip and its underlying strip of extra soft rubber (not here shown), and which has been cut to a length giving the desired volume of material in the tread as determined by its weight, is applied to the wheel 42, whose perimeter has been contracted by withdrawing the cone 45, the leading end of the tread is attached to the wheel by means of the clamp 55, 56, and the following end is attached wherever it comes by means of the shiftable clamp 59. On account of the difficulty of making the tread strip exactly to gage, it is made up so that when cut to a length that gives the required weight of tread, it is never of greater length than the periphery of the tire carcass, and generally less than that periphery by an amount within an allowable limit. The tread is stretched to the exact desired length by expanding the perimeter of wheel 42 by means of the cone 45, the handle 51 being turned to force said cone inwardly until the following end of the tread reaches a length, measured on the tape 63, which is known to be the circumferential measurement of the tire carcass on core 10. In case the tread is initially of the required length, the expanding mechanism will not be operated. The expanding mechanism may also be left out of operation even when the tread strip is initially shorter than its ultimate length, by using the alternative method of stretching the tread on the periphery of wheel 42 by hand, in which case 42 becomes the equivalent of a solid-rim wheel of fixed diameter.

The tread being now ready for application to the carcass, wheel 42 is rotated by hand until the leading end of the tread is opposite the contact point between core and wheel, and said wheel and its standard 68 are swung over against the core. An operator takes hold of handle 57 to open the clamp 55, 56, and the tread 79, sticking to the surface of the carcass 11, is rolled onto the latter as indicated in Fig. 1, the core being rotated by hand and the tread unwrapping itself from the wheel 42 until the following end of the tread is nearly reached, whereupon the clamp 59 is removed and the application completed. It is found that a tire tread applied with this machine is positioned much more quickly and accurately and the rubber more evenly distributed than with the old hand method, and the amount of labor required is less.

The above describes a preferred construction and mode of operation of the tread-applying wheel, but it is to be understood that I do not wholly confine myself to the use of an expanding wheel and all its accessories, such as the measuring tape, but may variously modify the construction and operation and may use less than the entire number of parts shown.

The operation of rolling down or stitching the margins of the tread strip into conformity with the contour of the core could now be performed in the usual manner with hand stitching tools, or it can be done by bringing into play another part of the apparatus shown in my drawings. Pivoted on a vertical bolt 80 located under the chuck shaft 13 in line with a vertical diameter of the tire core is a swinging base plate 81 on which is supported a fixed horizontal 'hollow shaft 82 (Fig. 5) and on said shaft swings loosely the hub of a standard 83. An upright swivel stem 84 turns in anti-friction bearings 85, 86 on said standard and has attached to its upper end a swiveling bracket 87 carrying a block 88 at its upper end. The latter is pivoted at 89 on the bracket 87 so as to be angularly adjustable in a horizontal plane, and is formed with guides 90 for the carriage 91 carrying a stitching wheel or roller 92, the said carriage being adjustable radially of the tire core by a handle 93, whose screw stem 94 is formed with a steep-pitched thread engaging a nut on the lower side of the carriage. The bearings for wheel 92 are supported on a plunger 95 having a limited yielding movement against a spring 96 whose tension is adjusted by a screw 97. A stop-screw 98 occupying a slot 99 in the wall of the plunger 95 limits the movement of the latter.

This stitcher is manipulated by means of the handle 93, and, by reason of the swinging movement of the standard 83 in a vertical plane toward and from the tire core, the horizontal swinging movement of bracket 87 to carry roller 92 around the tread of the tire, the swivelling movement of block 88 on its pivot stem 89 to change the angle of the stitcher wheel, the positive advance and retraction of said wheel effected by screw 94 and its handle 93, and the automatic advance and retraction thereof permitted by the spring 96 in conformity with the contour of the tire, together afford a universal adjustability to the stitcher wheel in a subsantially horizontal, radial plane which allows the margins of the rubber tread to be quickly rolled into place against the revolving tire carcass.

The base plate 81 is substantially T-shaped, and the ends of its cross-bar are supported on two segmental under-cut tracks, 100, 101, mounted on the floor. Under the flanges of these tracks are located the heads of a pair of locking bolts 102, whose stems pass upwardly through the grooves between the track flanges. The upper part of each bolt is a rectangular frame which embraces a horizontally movable wedge, 103 and has an adjustable bearing-block 104 seated upon the inclined upper surface of said wedge as seen in Fig. 6.

Recesses in the wedges are occupied by short arms 105 whose hubs are attached to a rock-shaft 106 journaled in the hollow shaft 82, there being fixed on one end of said rock-shaft an upright weight-arm 107 movable to either side of a vertical line so as to hold the wedges 103 in or out of bolt-locking position, and on the other end an upright handle-arm 108 for turning said rock-shaft 106 to operate the wedges. A stop-pin 109 mounted on a vertical bracket 110 rigidly attached to the base-plate 81 limits the movement of the handle-arm in a wedge-releasing direction.

Provision is further made for locking the swinging standard 83 in any position in which it may be desired to set it with reference to the periphery of the tire core, the same comprising a fixed segment 111 on the upper end of a bracket 110 and a clamp screw 112 mounted in the standard 83 and provided with a handle 113, there being stop shoulders 114 (Fig. 7) on the segment 111 to limit the swinging movement of the standard.

Assuming that the stitcher is in the operative position shown in Fig. 2 its baseplate locked by throwing the handle-arm 108 over to the right and its standard 83 locked in operative position by means of the clamp screw 112, the stitcher wheel 92 is manipulated by the handle 93 while the core 10 is being revolved, so as to swing said wheel through the necessary arc around the tread of the tire and cause it to roll down the margins of the tread strip on either side. After this operation has been completed, the tire core is brought to rest, the clamp screw 112 unlocked and the standard 83 swung outwardly to remove the stitcher from the tire, then the handle-arm 108 is thrown to the left to unlock the bolts 102, and the frame 81 is swung around the pivot 80 along the tracks 100, 101, to a position substantially at right-angles to that shown in Fig. 2 and is locked in that position by manipulating the handle-arm 108, whereupon the tire may be completed by having the side strips of rubber applied thereto and rolled down by hand tools and any other finishing operations performed, the plane of the core being swung to any convenient angle on shaft 20 as an axis, the locking bolt 35 being used to hold it in various positions and the core being revolved by power in any of these positions.

My invention is not confined to the exact details above described, as various modifications may be made within the scope of the claims.

I claim:

1. In a pneumatic-tire forming machine, the combination of a rotatable tire core, a tread-applying wheel having an operative circumference exceeding that of the core, mounted in rolling relation thereto, and means for securing a tire tread in longitudinally-stretched condition on the periphery of said wheel.

2. In a machine of the character described, the combination of a rotatable tire core, a tread-applying wheel whose periphery is substantially flat transversely mounted in rolling relation thereto and adapted to support the full length of a tire-tread for a carcass built on said core, and means for securing the tread to said wheel.

3. In a machine of the character described, the combination of a rotatable tire core, a tread-applying wheel in rolling relation thereto, and means for temporarily securing both ends of the tread to the periphery of the wheel.

4. In a machine of the character described, the combination of a rotatable tire core, a tread-applying wheel mounted in rolling relation thereto, and clamps on said wheel for attaching the ends of the tread to the periphery of the wheel.

5. In a machine for applying rubber treads to pneumatic-tire carcasses, the combination of a rotatable tire core, and a tread-applying device mounted in rolling relation to said core and having means for stretching the tread to a predetermined length.

6. In a machine for applying rubber treads to pneumatic-tire carcasses, the combination of a rotary core, and an expansible tread-stretching wheel mounted in tread-applying rolling relation thereto.

7. In a machine for applying rubber treads to pneumatic-tire carcasses, the combination of a rotary tire core, and a circumferentially-expansible tread-applying wheel whose expanded circumference exceeds the circumference of a tire carcass on said core, said wheel being adapted to operate in rolling relation to the periphery of the carcass, with the tread-strip intervening, whereby a tread-strip stretched on said wheel is progressively applied to the carcass.

8. In a machine for applying rubber treads to pneumatic-tire carcasses, the combination of a rotary core chuck, and a tread-stretching wheel adapted to roll a tread-strip onto a carcass-covered core supported by the chuck, said wheel having an expansible rim, and means for clamping the two ends of the tread-strip on the rim of said wheel.

9. In a machine for applying rubber treads to pneumatic-tire carcasses, the combination of a rotary core chuck, a tread-applying wheel adapted to roll a tread-strip onto a carcass-covered core supported by the chuck, a clamp on the wheel for the leading end of the strip, and a clamp for the other end thereof, shiftable to different positions along the wheel rim.

10. In a machine for applying rubber treads to pneumatic-tire carcasses, the combination of a rotary core, and a tread-stretching wheel mounted in rolling relation thereto and having a segmental rim, and means for radially adjusting the segments to expand and contract the circumference of said wheel.

11. In a machine for applying rubber treads to pneumatic-tire carcasses, the combination of a rotary core chuck, and a tread-stretching wheel operatively related thereto and having a segmental rim, and means for radially adjusting the segments to expand and contract the circumference of said wheel, a plurality of said segments being provided with tread-strip clamps.

12. In a machine for applying rubber treads to pneumatic-tire carcasses, the combination of a rotary core chuck, a tread-stretching wheel operatively related thereto and having its rim composed of radially-adjustable segments, a plurality of which are formed with clamp-attaching members, a clamp for one end of the tread-strip, attachable alternatively to any one of said members bers, and means on the wheel for clamping the other end of the tread-strip.

13. In a machine for applying rubber treads to pneumatic-tire carcasses, the combination of a circumferentially-expansible tread-stretching wheel, and means at the rim thereof for measuring the length of a tread-strip carried on said rim.

14. In a machine for applying rubber treads to pneumatic-tire carcasses, the combination of a tread-stretching wheel whose rim is composed of a series of radially-adjustable segments, and a graduated measuring tape substantially coinciding with said rim and having one end fixed.

15. In a machine for applying rubber treads to pneumatic-tire carcasses, the combination of a tread-stretching wheel whose rim is composed of radially-adjustable segments, guide-pulleys mounted on each of a consecutive series of said segments, and a measuring tape carried on said pulleys.

16. In a machine for applying rubber treads to pneumatic-tire carcasses, the combination of a tread-stretching wheel having an expansible rim, a clamp thereon for one end of the tread strip, and a measuring tape coinciding with said rim and having one end fixed adjacent to said clamp.

17. In a machine for applying rubber treads to pneumatic-tire carcasses, the combination of a tread-stretching wheel having an expansible rim, a measuring tape coinciding with said rim and having one end fixed thereon, and a spring attached to the other end of the tape for keeping the latter taut.

18. In a machine for applying rubber treads to pneumatic-tire carcasses, the combination of a tread-stretching wheel having a rim composed of radially-adjustable segments provided on one edge with tape-guides, a measuring tape supported on said guides and having one end fixed, the other and movable end being led inwardly around the last guide, and a spring within the periphery of the wheel, attached to the movable end of said tape.

19. In a machine for applying rubber treads to pneumatic-tire carcasses, the combination of a rotary core, and a tread-stretching wheel adapted to roll a tread-strip onto a tire-carcass on said core, said wheel having a rim composed of radially-adjustable segments, clamps on said rim for the two ends of the tread strip, tape guides on the segments, a measuring tape supported on the guides and having one end fixed opposite one of said clamps, and a spring attached to the other end of the tape for keeping the latter taut.

20. In a machine for applying rubber treads to pneumatic-tire carcasses, the combination of a rotary core-chuck, and a tread-stretching wheel in operative relation thereto, said wheel having a rim composed of radially-adjustable segments, means for simultaneously adjusting the segments to expand and contract the rim, and clamps for attaching the two ends of a tread-strip to said rim.

21. In a machine for applying rubber treads to pneumatic-tire carcasses, the combination of a tread-stretching wheel whose rim is composed of a series of radially-adjustable segments having raised portions on their outer surfaces for supporting the tread-strip, and means for clamping the ends of the tread-strip to said rim.

22. In a machine for applying rubber treads to pneumatic-tire carcasses, the combination of a tread-stretching wheel whose rim is composed of a series of radially-adjustable segments having longitudinal tread-supporting ribs, and clamps for the ends of the tread-strip.

23. In a machine for applying rubber treads to pneumatic-tire carcasses, the combination of a tread-stretching wheel whose rim is composed of a series of radially-adjustable segments having transverse tread-supporting ribs, and clamps for the ends of the tread-strip.

24. In a machine for applying rubber treads to pneumatic-tire carcasses, the combination of a rotary tire core, a tread-applying wheel adapted to have the tread strip wrapped thereon and to roll it progressively onto the core, means for temporarily securing said tread to the wheel, and side-edge positioning marks on the periphery of the wheel for laterally registering the tread strip thereon.

25. In a machine for applying rubber treads to pneumatic-tire carcasses, the combination of a tread-applying wheel provided on its outer surface with marks for positioning the tread-strip transversely of the rim, and clamps for the ends of the tread-strip.

26. In a machine for applying rubber treads to pneumatic-tire carcasses, the combination of a tread-stretching wheel whose rim is composed of a series of radially-adjustable segments having longitudinal tread-supporting ribs, and transverse tread-supporting ribs provided with pairs of positioning marks, and means for clamping the ends of the tread-strip on said rim.

27. In a machine for applying rubber treads to pneumatic-tire carcasses, the combination of a tire core mounted to rotate in a vertical plane, a tread-applying wheel adapted to roll a tread-strip onto a tire-carcass on said core, a standard carrying said wheel and pivoted below the latter to swing substantially in the plane of the core, a counter-weight, and connections whereby the standard automatically picks up said counter-weight when swung inwardly toward the core.

28. In a machine for applying rubber treads to pneumatic-tire carcasses, the combination of a tire-core mounted to rotate in a vertical plane, a tread-applying wheel mounted for movement in the plane of said core into and out of operative rolling relation thereto and also mounted for movement into a plane transverse to that of the core.

29. In a machine for applying rubber treads to pneumatic-tire carcasses, the combination of a tire-core mounted to rotate in a vertical plane, a tread-applying wheel, and a standard on which said wheel is rotatably mounted and on which it is also swiveled to turn the plane of the wheel into and out of the plane of the core, said standard being pivoted to swing said wheel in the plane of the core into and out of operative rolling relation to the latter.

30. In a machine for applying rubber treads to pneumatic-tire carcasses, the combination of a rotary tire core, a tread-applying wheel movable into and out of operative rolling relation thereto, a support pivoted in line with a diameter of said core and carrying a tread-stitching device, a segmental track for said support, and means for locking the support to said track in the operative and inoperative positions of the stitching device.

31. The method of applying wearing tread strips to pneumatic tire carcasses which consists in preparing a rubber tread strip of a length less than the circumference of the finished tire and containing the desired amount of material for the tread, stretching said strip to its ultimate length before application to the carcass, and progressively wrapping said strip on the carcass.

32. The method of applying wearing tread strips to pneumatic tire carcasses which consists in preparing a rubber tread strip of a length less than the circumference of the finished tire, stretching said strip to its ultimate length on a support other than the carcass, and rolling the strip from said support onto the carcass.

In testimony whereof I have hereunto set my hand this 2nd day of March 1916.,

FRANCIS B. CONVERSE.